(12) United States Patent
von und zu Liechtenstein

(10) Patent No.: US 11,126,262 B2
(45) Date of Patent: *Sep. 21, 2021

(54) GAZE INITIATED INTERACTION TECHNIQUE

(71) Applicant: Maximilian Ralph Peter von und zu Liechtenstein, Douglas (IM)

(72) Inventor: Maximilian Ralph Peter von und zu Liechtenstein, Douglas (IM)

(*) Notice: Subject to any disclaimer, the term of this patent is extended or adjusted under 35 U.S.C. 154(b) by 0 days.

This patent is subject to a terminal disclaimer.

(21) Appl. No.: 17/097,226

(22) Filed: Nov. 13, 2020

(65) Prior Publication Data

US 2021/0064131 A1 Mar. 4, 2021

Related U.S. Application Data

(63) Continuation of application No. 17/013,604, filed on Sep. 6, 2020, now Pat. No. 10,845,875, which is a continuation of application No. 16/406,954, filed on May 8, 2019, now Pat. No. 10,782,778, which is a continuation of application No. 15/017,606, filed on Feb. 6, 2016, now Pat. No. 10,341,352.

(51) Int. Cl.
| | | |
|---|---|---|
| *G06F 3/01* | (2006.01) | |
| *H04L 29/08* | (2006.01) | |
| *G06F 16/9536* | (2019.01) | |
| *G06K 9/00* | (2006.01) | |

(52) U.S. Cl.
CPC .......... *G06F 3/013* (2013.01); *G06F 16/9536* (2019.01); *H04L 67/306* (2013.01); *H04L 67/36* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 8,854,282 B1 * | 10/2014 | Wong | G02B 27/017 345/8 |
| 2013/0110827 A1 * | 5/2013 | Nabar | G06F 16/9535 707/728 |
| 2014/0160250 A1 * | 6/2014 | Pomerantz | H04N 5/23229 348/47 |
| 2015/0171926 A1 * | 6/2015 | Coelho | H04B 5/0025 455/41.2 |
| 2015/0245079 A1 * | 8/2015 | Tremblay | H04H 20/38 725/116 |
| 2016/0005233 A1 * | 1/2016 | Fraccaroli | G02B 27/0172 345/633 |
| 2016/0295401 A1 * | 10/2016 | Berge | H04L 63/0407 |
| 2016/0316503 A1 * | 10/2016 | Raphael | H04W 76/11 |

* cited by examiner

*Primary Examiner* — Jwalant Amin

(57) ABSTRACT

A gaze initiated interaction technique for facilitating interaction between wearers of head-mountable devices. Methods are shown which allow users to interact with each other following an event of interlocking gaze. Methods are also shown which allows the operator of a personal point-of-interest beacon to control and limit interaction from the public thus ensuring a greater degree of privacy. Methods are also introduced which allow a mode of interaction to be determined by a remote service after mutual authorization of each interacting user. This disclosure also introduces a system of a head-mountable device which comprises a directional beacon transceiver system using beams in the infrared light spectrum enabling the detection of a gaze interlock event.

30 Claims, 8 Drawing Sheets

GAZE INITIATED INTERACTION TECHNIQUE

CROSS REFERENCE TO RELATED APPLICATIONS

This application is a continuation of the following U.S. patent application, which is incorporated by reference in its entirety:
U.S. Non-Provisional application Ser. No. 17/013,604, filed Sep. 6, 2020, which is a continuation of the following U.S. patent application, which is incorporated by reference in its entirety:
U.S. Non-Provisional application Ser. No. 16/406,954, filed May 8, 2019, which is a continuation of the following U.S. patent application, which is incorporated by reference in its entirety:
U.S. Non-Provisional application Ser. No. 15/017,606, filed Feb. 6, 2016.

STATEMENT REGARDING FEDERALLY SPONSORED RESEARCH OR DEVELOPMENT

Not applicable to this application.

BACKGROUND

Field

Example embodiments in general relate to a gaze initiated interaction technique for inviting, initiating and performing interaction between wearers of head-mountable devices.

Prior Art

Any discussion of the related art throughout the specification should in no way be considered as an admission that such related art is widely known or forms part of common general knowledge in the field.

With the advent of wearable devices the concept of point-of-interest beacons has received an increasing amount of attention in recent years, with the iBeacon technology becoming more and more prevalent. Current technology is centered around beacons being assigned unique identifiers, such as UUIDs, and configuring these beacons to transmit their static and permanent identifiers with a low range omnidirectional transmitter, such as Bluetooth LE. Whilst this technology is particularly suited to allow interfacing the point-of-interface beacons of large and inanimate objects, such as buildings or storefronts, there are a number of shortcomings which currently stand in the way of using point-of-interest beacons to facilitate interpersonal communication.

SUMMARY

This disclosure provides, in part, a group of methods.

One method includes detecting the gaze of a person wearing a head-mounted device and providing means for interacting with that person. Several means are known that allow detecting beacons associated with points-of-interest in an augmented reality environment. However, when a point-of-interest is associated with a person that person may not desire being tracked or contacted by an unrestricted group of people. The method also provides a means to authenticate against a point-of-interest beacon through mediation of a remote network, such as a social network.

Another method includes enabling the user of a head-mountable device to invite interaction from other members of a shared network. The method includes providing a means for the beacon user to restrict visibility and interaction with regards to other users. Therefore the beacon user remains anonymous to other users of similar head-mountable devices and only becomes visible to a select group of members of a network. The method includes a means to configure the head-mountable device to project the beam of the point-of-interest beacon in the direction of the user's gaze.

Another method includes configuring a remote service to provide authorization for interaction with a point-of-interest. The server determines whether access should be granted based on inclusion or exclusion criteria set in user profiles. If access is granted, the function returns an interface to the point-of-interest.

This disclosure also provides, in part, a system of a head mounted device (HMD). The system includes a directional beacon transmitting a unique identifier. The unique identifier may be changed in regular intervals such as to avoid tracking and to provide a degree of privacy and anonymity. The system may implement the directional point-of-interest beacon with an infrared light source. The system also includes a means for receiving a directional point-of-interest beacon, which may be implemented by an infrared-spectrum camera pointing in the same direction as the gaze of the user.

There has thus been outlined, rather broadly, some of the features of the gaze initiated interaction technique in order that the detailed description thereof may be better understood, and in order that the present contribution to the art may be better appreciated. There are additional features of the gaze initiated interaction technique that will be described hereinafter and that will form the subject matter of the claims appended hereto. In this respect, before explaining at least one embodiment of the gaze initiated interaction technique in detail, it is to be understood that the gaze initiated interaction technique is not limited in its application to the details of construction or to the arrangements of the components set forth in the following description or illustrated in the drawings. The gaze initiated interaction technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Among the techniques known in the prior art are those point-of-interest beacons which transmit static identifiers, commonly UUIDs (universally unique identifiers). Even though a UUID can be anonymous at the point of creation, once it has been associated with a person it can be used to track that person, which is considered a disadvantage in any scenario involving a requirement of privacy. The present invention, in part, provides a technique which allows the user of head-mountable device to publicly broadcast a constantly changing identifier thus making it difficult to track or identify the beacon user. At the same time the broadcast identifier can serve the function to invite interaction from a select group of member of a shared network, such as a shared social network. Importantly the novel technique does not necessarily restrict interaction to other network users, i.e. social network friends, previously associated with the beacon user. The technique also provides methods which allow beacon users to restrict access by setting profile filtering criteria, such as by setting which profile parameters another social network user must exhibit in order to be allowed to interface with the beacon user. Therefore the novel technique offers, in part, the possibility that a social network, for example, can mediate authentication and authorization between beacon users. Other than authentication and authorization, the technique can also serve to select and serve the appropriate interface for interaction. There may be a number of augmented-reality apps, which can provide such interface. The disclosed technique will allow a social network to select the most appropriate interface based on an algorithm taking into account both user profiles and the context of a gaze interlock event. The technique which is subject to this invention also proposes a system of a head-mountable device comprising a beacon system, whereby both the transmitter and the receiver beam are envisaged to be directional, whereas prior art embodiments of such beacons tend to be omnidirectional. The reason for seeking directional beams lies in solving the problem of how find a technological equivalent to the basic human interaction of the gaze of two persons meeting. In a preferred embodiment the directional beacon transmitter is implemented as a directional beam of light in the infrared spectrum, whereas the directional beacon receiver is implemented as an infrared-spectrum camera facing the same direction as the gaze of the user of a head-mountable device.

Figure 1A:
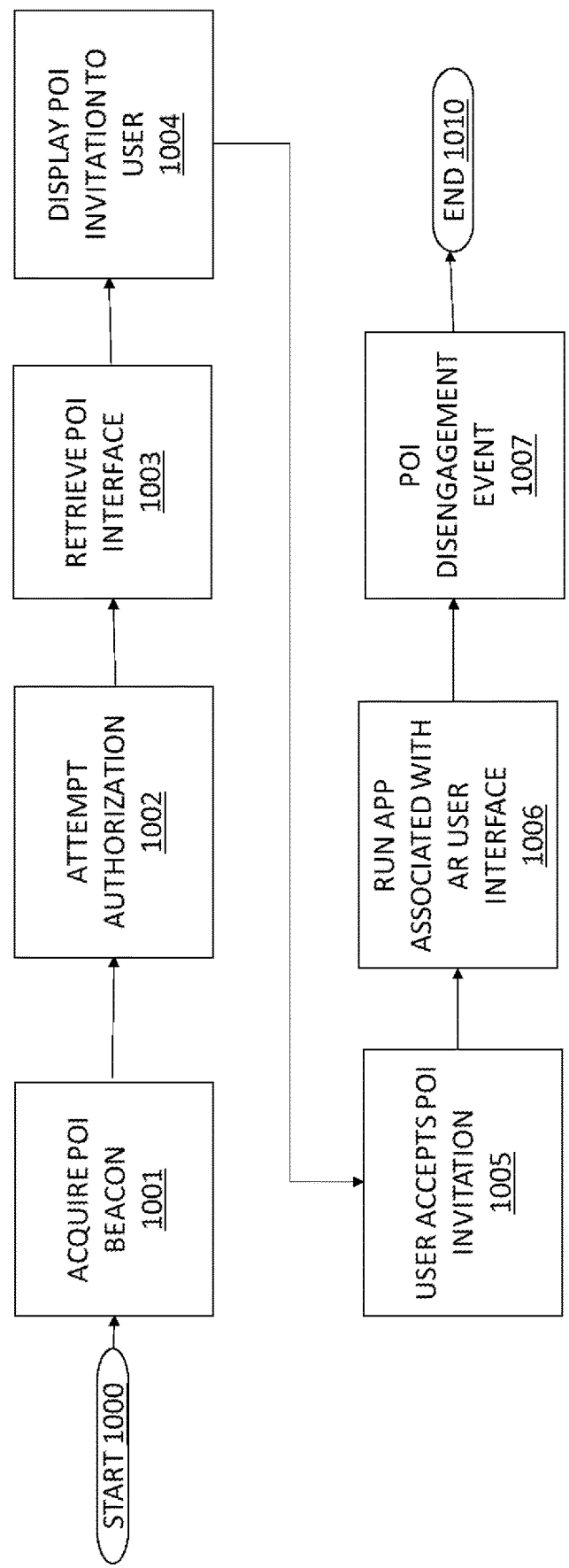
FIG. 1A is a block diagram of an example embodiment.

The block diagram of FIG. 1A illustrates the process flow of a beacon interaction from the perspective of the user of a head-mounted device looking to interact with other users. The process starts 1000 with a personal point-of-interest beacon being acquired 1001. At this point the user has only an anonymous identifier to go by and requires authorization 1002 before the anonymous identifier can be used for any kind of purpose. The authorization is requested from a remote server which can look up the anonymous identifier and match it with a profile on a network, such as a social network. As long as the authorization process is successful, the remote server returns a handle to an interface 1003. Once an interface to the point of interest is available the user is given the option to commence interaction with the point-of-interest 1004. If the user accepts that invitation for interaction 1005, then an application is started which is capable of using the interface returned in step 1003. The application is executed until a disengagement event 1007 is received, which ends 1008 the interaction.

Figure 1B:
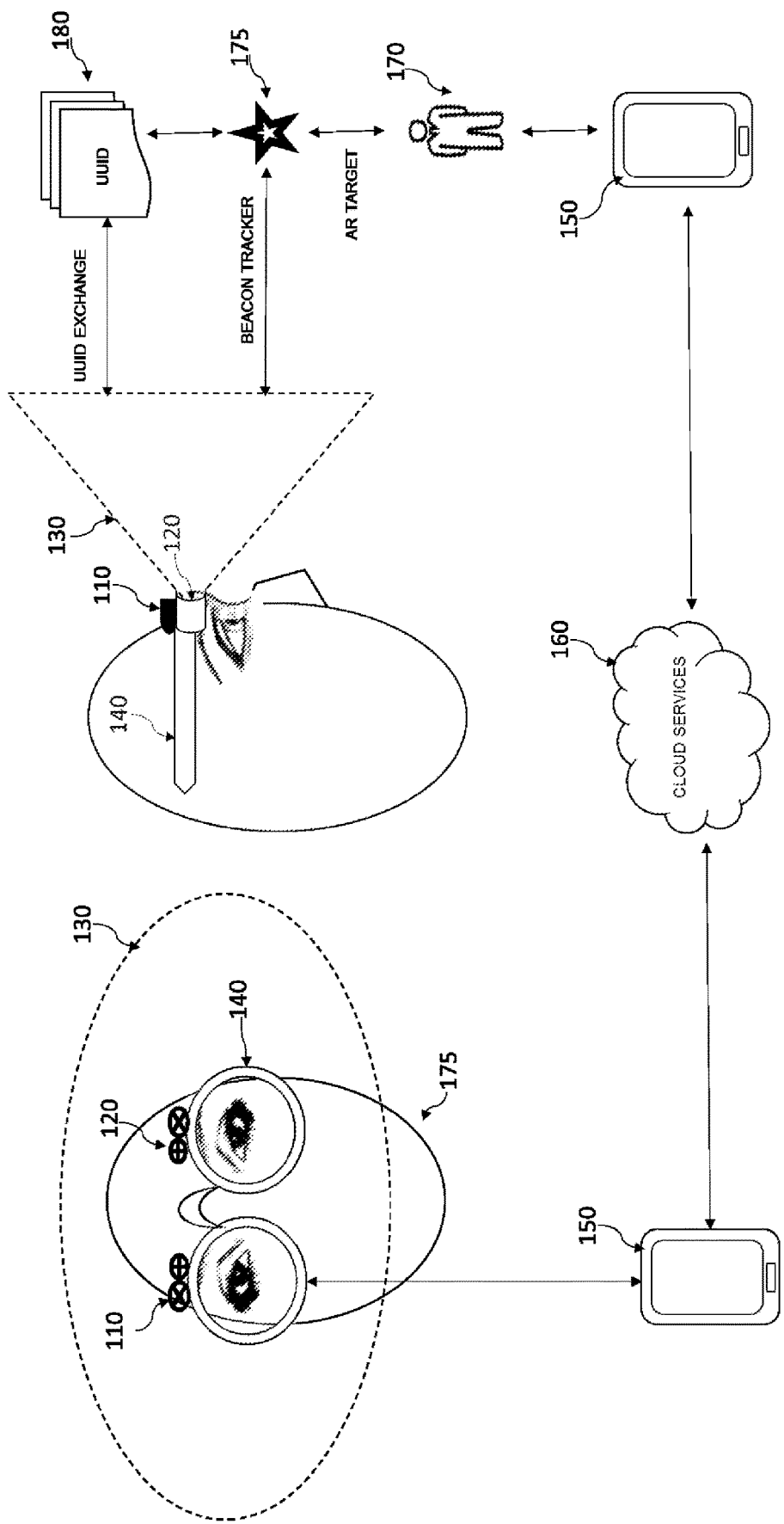
FIG. 1B is a first perspective view of a gaze initiated interaction technique in accordance with an example embodiment.

The schematic diagram in FIG. 1B depicts the hardware required in the scenario of a preferred embodiment of the present invention. Both persons taking part in the interaction are wearing a head-mountable device 140. The head-mountable device comprises both a beacon transmitter 110 and a beacon receiver 120. In a preferred embodiment both the beacon transmitter and the beacon receiver are configured to operate with light of the infrared spectrum. Both the transmitting and receiving beams are configured to coincide with the gaze of the user 130. Through the medium of the beacon beams two functions are being implemented. One such function is the exchange of the described anonymous unique identifiers 180. The other function is to track the point-of-interest beacon 175 in order to be able to project the corresponding beacon user 170 as an augmented reality target. In the preferred embodiment both interacting users 170 175 use a system which combines a head-mountable device with a smartphone-type handset 150. It is envisaged that all distributed functions with the exception of said beacon tracking and UUID exchange are processed by making use of cloud services 160 which are in turn accessed by functionality provided by the respective smartphone-type handsets 150.

Figure 2:
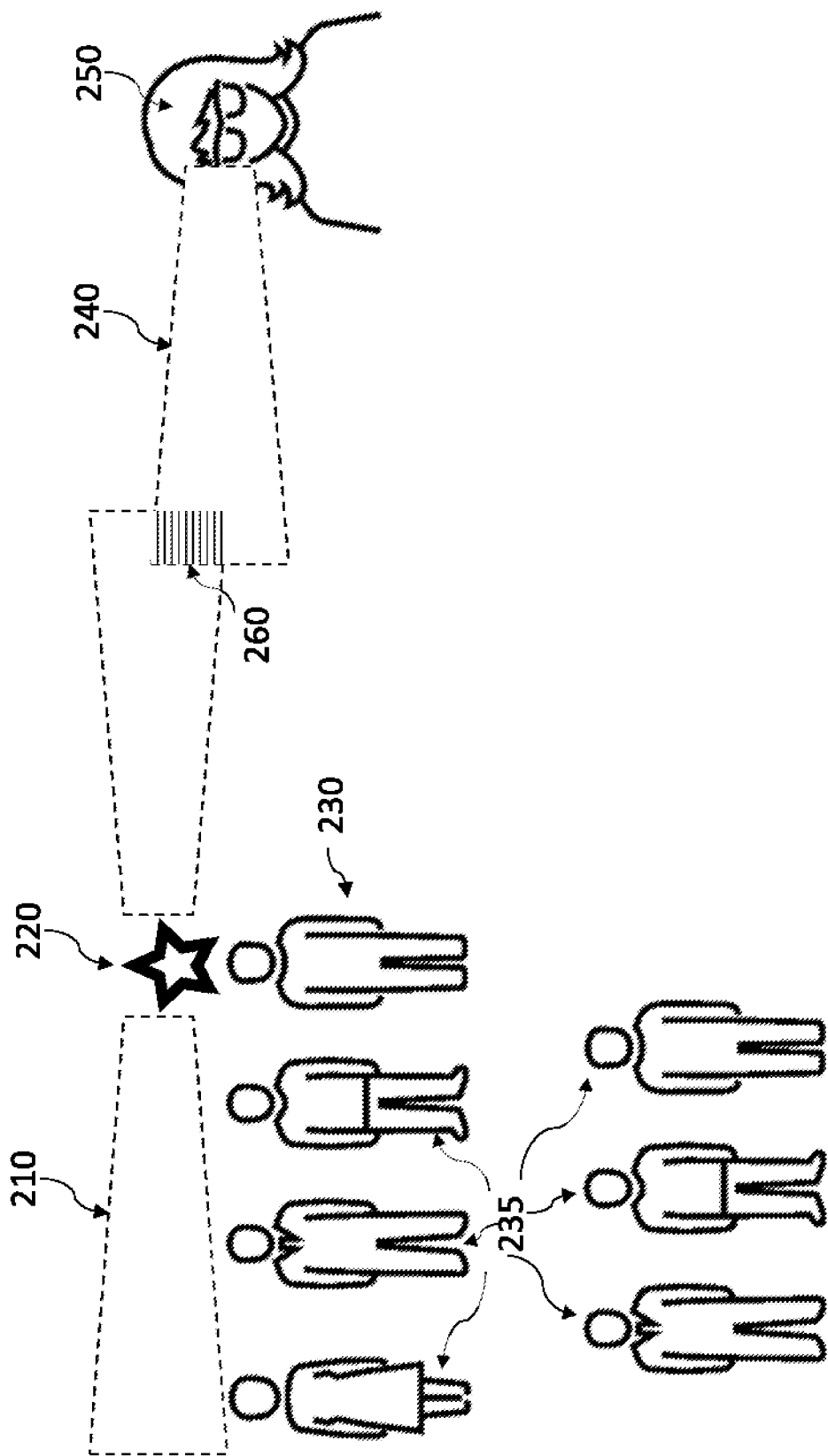
FIG. 2 is a frontal view illustrating a technique for utilizing interlocking gaze in respect of wearers of a head-mountable device.

FIG. 2 illustrates the gaze initiated interaction technique in the context of an augmented-reality setting whereby the figure depicts the first step of the technique comprising scanning the environment for other personal point-of-interest beacons in the field of view. The user 250 of a head-mountable device gazes in the direction of a crowd of people 235 whereby in the crowd there is a person 230 who operates a similar head-mountable device comprising a point-of-interest beacon 220. The beacon 220 disseminates a beam 210 corresponding to the gaze of the user 230. The first user 250 operates a similar beam transceiver corresponding to her gaze 240. Once an intersection of gaze-related beams 260 takes place, unique identifiers can be exchanged. In the depicted embodiment, however, it is sufficient if one of the users picks up the unique identifier of the beacon of the other user.

Figure 3:
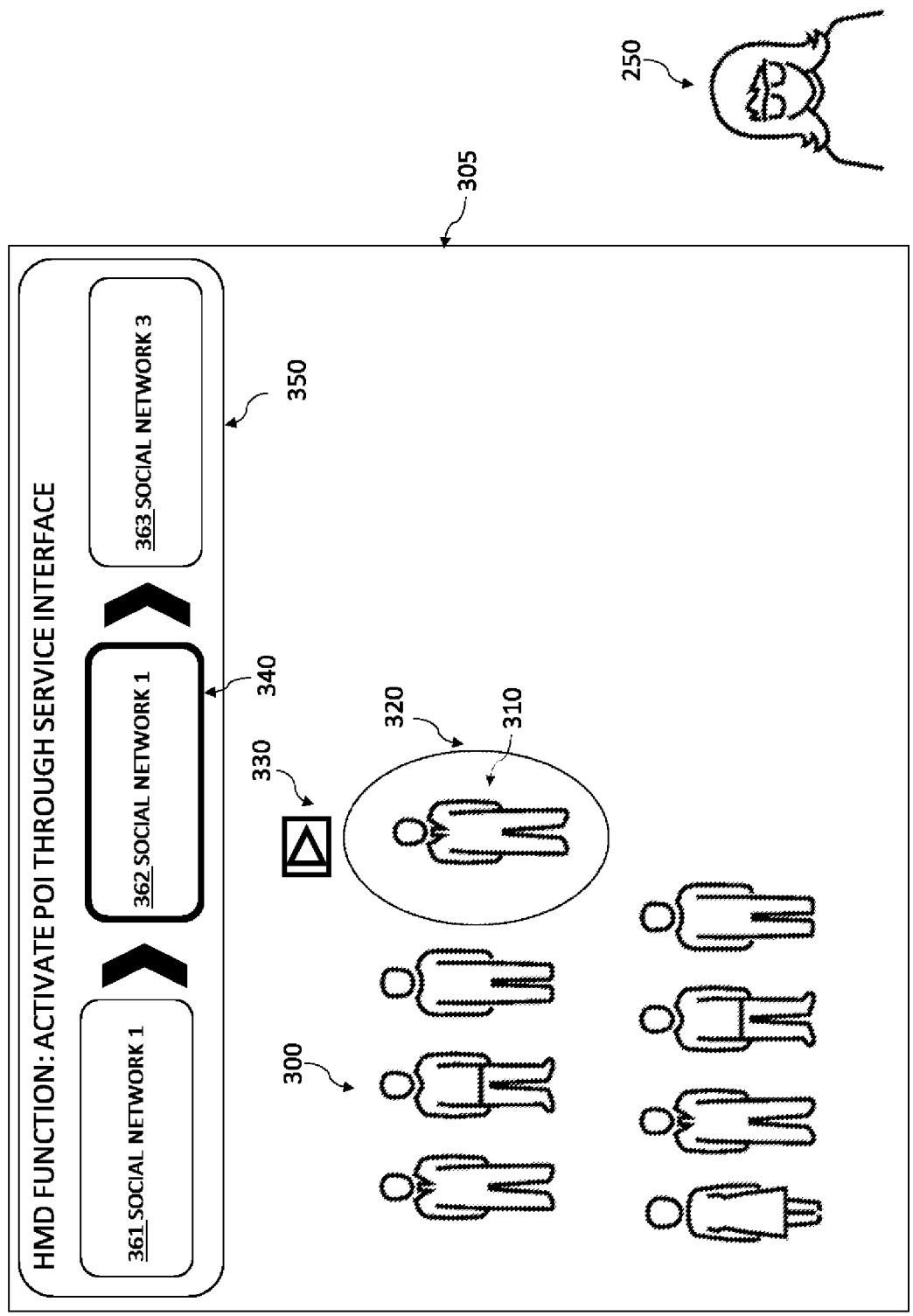
FIG. 3 illustrates an example embodiment relating to establishing contact with the user of a personal point-of-interest beacon.

FIG. 3 illustrates the gaze initiated interaction technique from the point of view of a user 250 at a point in time when authorization has been successfully performed on a plurality of social networks. The frame 305 depicts the boundary of the augmented-reality scene depicted. The frame contents simulate what the user 250 may see. Frame 350 denotes a menu panel superimposed on the augmented reality scenery. Frame 340 denotes an individual selectable menu item. The scenery comprises a crowd of people which are not enhanced by augmented reality. There is one individual 310 in the crowd who is enhanced in the augmented reality environment. The enhancement consists of providing a means of tracking 320 the individual in the field of view. An icon 330 hovers above the tracked individual 310. The said icon denotes that the tracked individual 310 offers an invitation for interaction to the other user 250. At this point of the interaction process no interface for interaction is available yet. In the example the user 250 is notified that authorization has been granted for interaction with the point-of-interest by altogether three social networks 361 362 363. The said user is prompted to select over which one of the social networks offered as selection the proposed interaction is to take place. The selection of network is important for the reason that the interface offered for interaction will normally be different for each network. If for example, the point-of-interest grants authorization both for interaction over a social network designed for dating and a social network designed for professional networking, then it is to be expected that the corresponding interfaces are substantially different.

Figure 4:
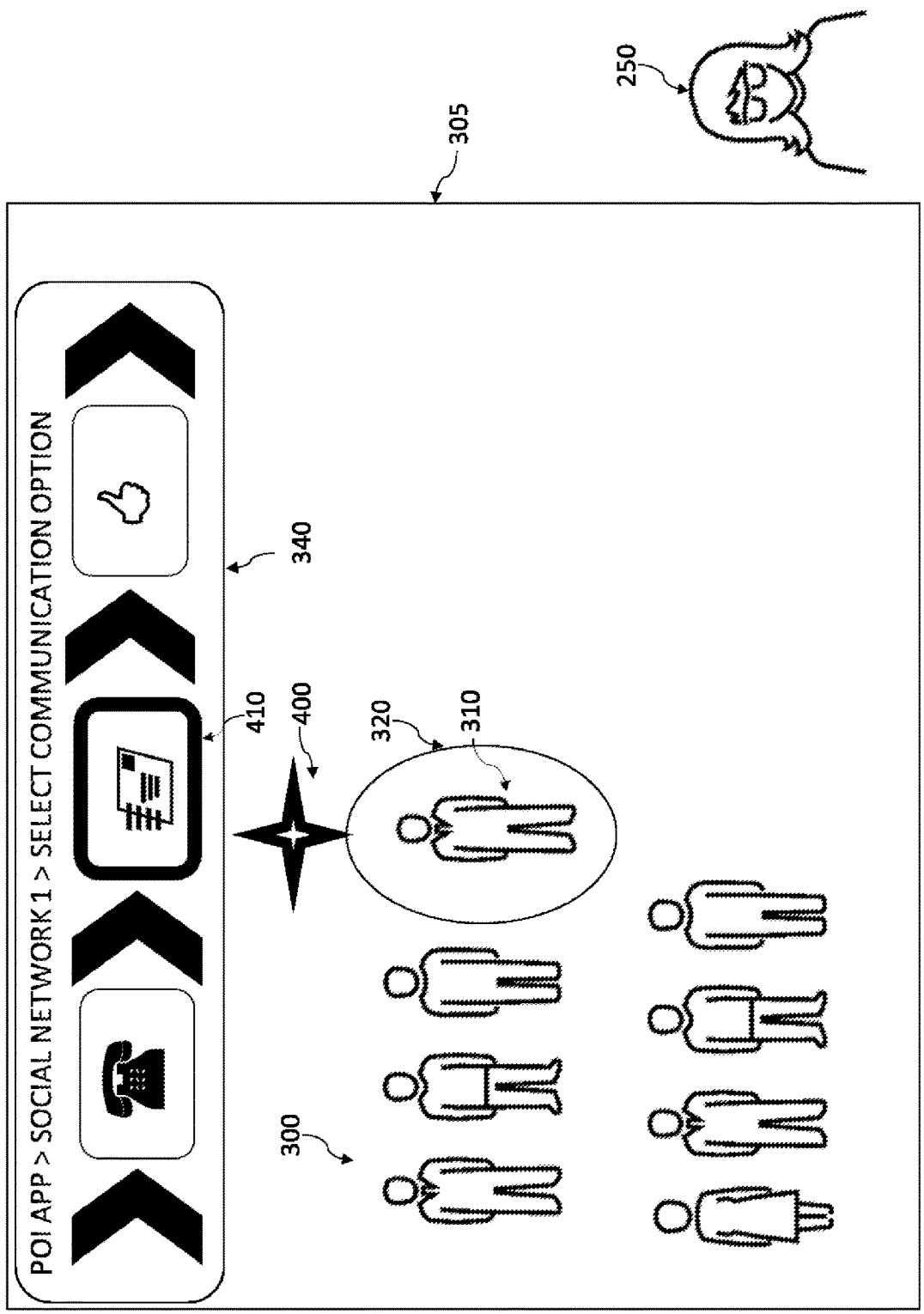
FIG. 4 illustrates an example embodiment relating to running an app on a head-mountable device relating to communications with the user of a personal point-of-interest beacon.

FIG. 4 depicts the use case started in FIG. 3 at the next phase of interaction. At this stage a preferred social network has been selected, the corresponding interface has been retrieved and an application has been launched which makes use of the said interface. Whilst the application is active a suitable icon 400 is projected above the tracked user 310 denoting that the currently active application interacts with said tracked user. Menu card 410 denotes an arbitrary interaction option, in this particular example the option to send a text message to the tracked user 310.

Figure 5:
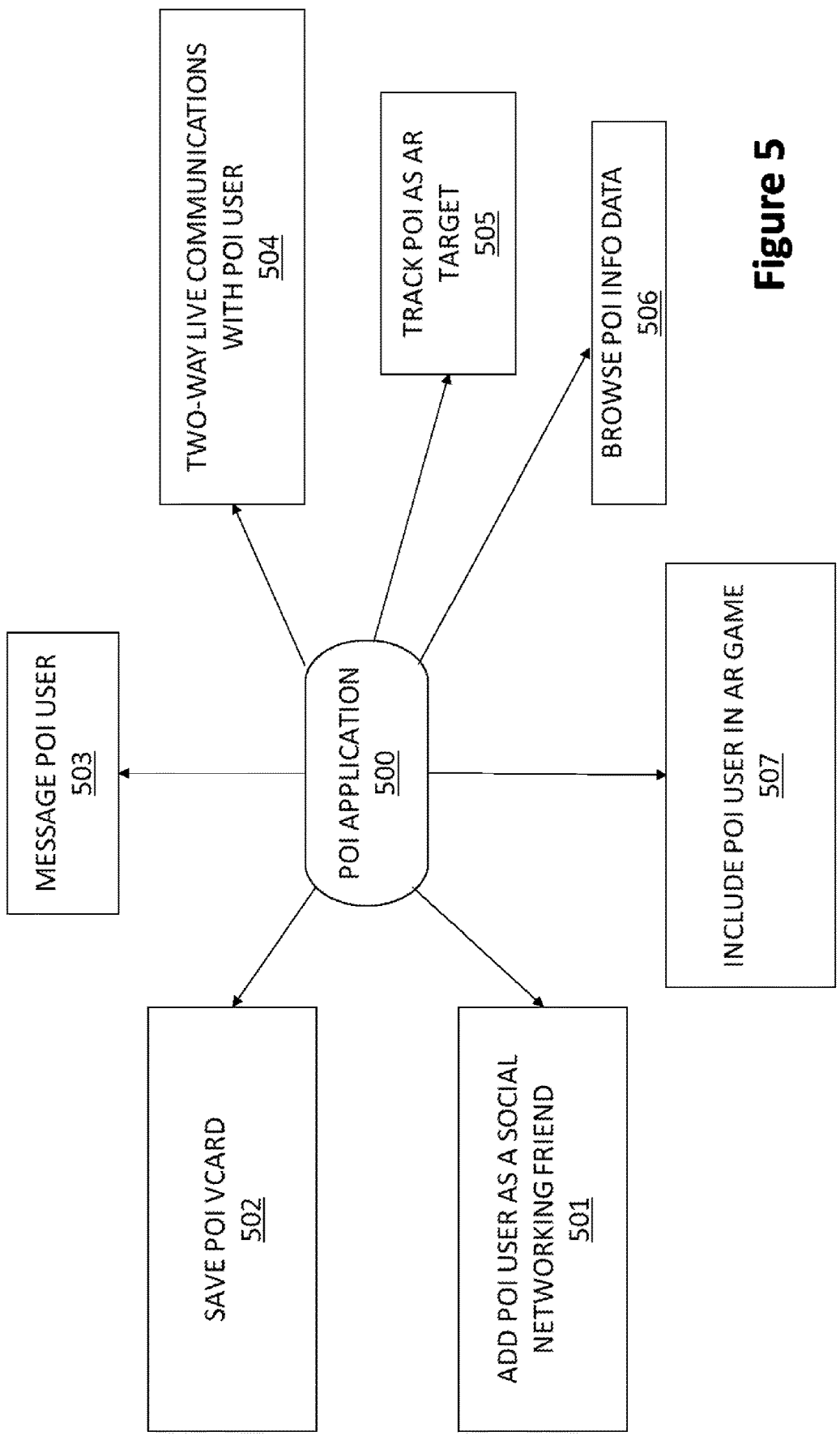
FIG. 5 is a block diagram depicting examples of the type of interaction which can follow acquisition of a personal point-of-interest beacon.

FIG. 5 is a block diagram providing more detail on preferred embodiments of the type of interaction between users of the gaze initiated interaction technique. Once an interface is obtained enabling contact to a personal point-of-interest beacon an application 500 is launched. The most basic application of that type would be one in which the second user is added as a friend 501 on the social network which has mediated the described authorization. Another possible application is the exchange of business cards, such as VCARDs 502. Sending a short text message 503 to the second user is another possible example application. In a similar way two way voice communications 504 may be initiated. The application may also restrict interaction simply to tracking the second user as an augmented-reality target 505. This use case would be particularly interesting in keeping track for example of a tour guide in a very crowded place. Another application would be to simply retrieve and browse profile attributes of the second user 506. In a gaming scenario it would be of particular interest to utilize the described gaze initiated interaction technique to initiate an application which allows to introduce a previously not acquainted member of the public into a running instance of an augmented reality game.

Figure 6:
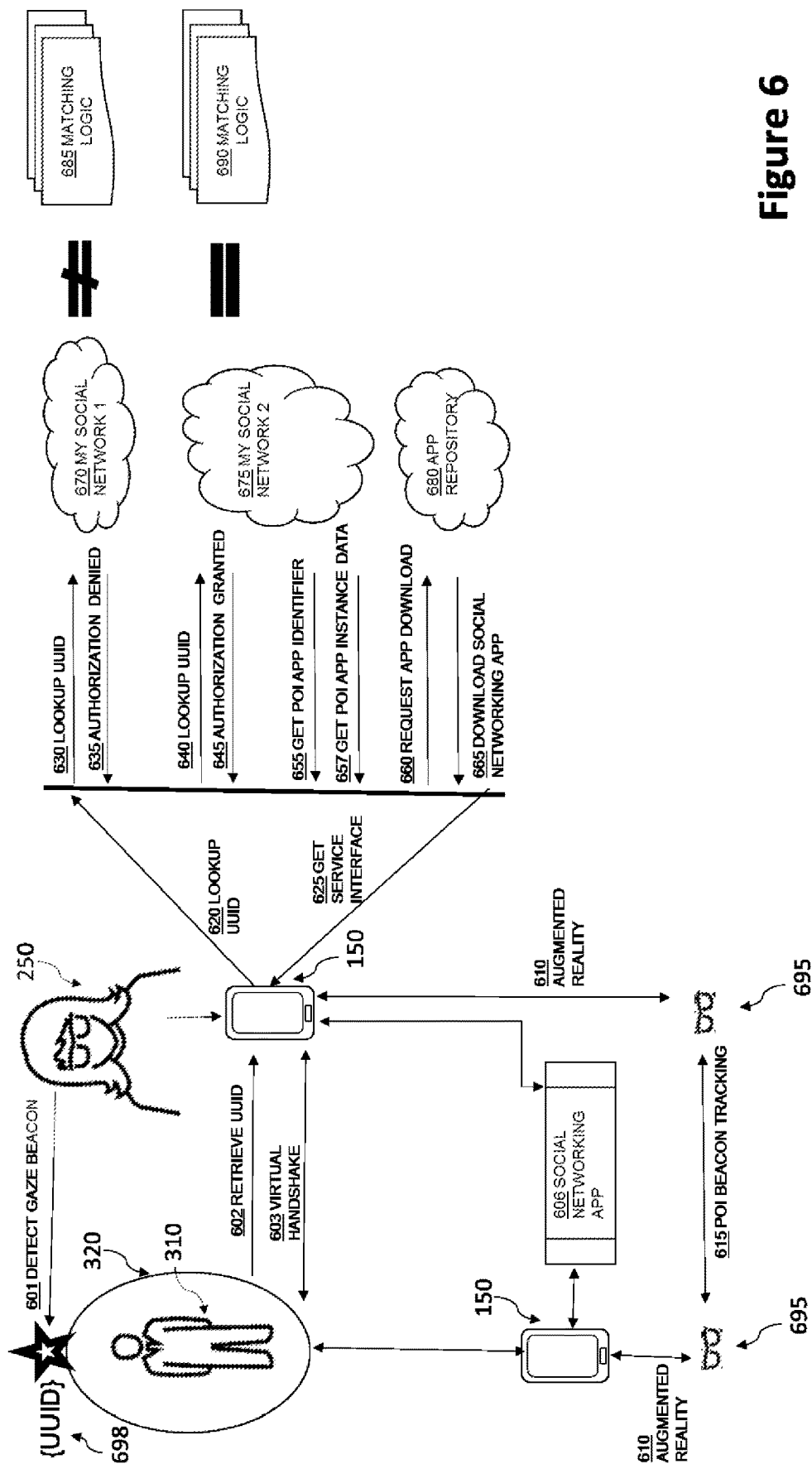
FIG. 6 is a flow diagram relating to an example embodiment depicting communications between two personal point-of-interest beacon users.

FIG. 6 describes an end-to-end use case of a gaze-initiated interaction between a first user 250 and a second user 310 in an augmented-reality environment. The second user 310 is operating a personal point-of-interest beacon transmitting an anonymous temporary unique identifier which is only known to one social network. Both the first and the second user use head-mountable devices 695 in combination with smartphone-type handheld mobile devices 150. The interaction starts with the first user 250 detecting the point-of-interest beacon 601 of the second user 310. Upon detection of the point-of-interest beacon the unique identifier of the beacon is retrieved. It has to be noted that a point-of-interest beacon may transmit more than one identifier. If that is the case, the following lookup process is repeated for each of the identifiers. In the described use case, however, it is assumed that only one unique identifier is being transmitted. For the next step the handset 150 of the first user 250 establishes a connection with the Internet in order to access a plurality of cloud services. From the point of view of the first user the input 620 for the lookup process is the unique ID 698 of the beacon relating to the second user, whereas the output 625 is a service interface to the second user. The steps required to retrieve the service interface based on the lookup of the unique identifier are as follows: at first the identifier is submitted 630 to a lookup service of a first social network 670, which is a social network on which the first user 250 has an account and a profile; if the unique identifier 698 is registered on that social network an algorithm 685 comprising a matching logic is executed, in such a way that the algorithm takes into account inclusion and exclusion criteria associated with both the profile of the first user 250 and the second user 310; the outcome of the matching process determines whether authorization is granted to the interaction request; in the present use case lookup process 630 returns a negative authorization result 635; the next steps comprise iterating through a plurality of social networks to which the first user 250 has subscribed; for each social network the lookup process is repeated; in the specific use case lookup 640 is successful since the matching algorithm 690 yields positive authorization and as a result the social network 675 grants authorization for interaction 645; once authorization has been obtained it is necessary to obtain an application for interaction, for that purpose the social network 675 is queried for the identifier of a suitable application; subsequently an identifier for the respective application is obtained 655; in order to be able to run the application instance data has to be obtained 657, also from social network 675; before the application can be launched it is necessary to ensure that the application itself is available on the mobile devices of the first user 250; in the present use case the application has not yet been installed and has to be requested 660 and downloaded from an online app repository 680. Once authorization has been granted and the application is running and has been provided with instance data, then the user 250 is notified that augmented-reality interaction with user 310 is possible through application instance 606. Both users 250 310 are queried to agree to a virtual handshake which initiates interaction through the app 606, if affirmed. For as long as the application 606 is active both users track each other in the augmented-reality environment 615.

Figure 7:
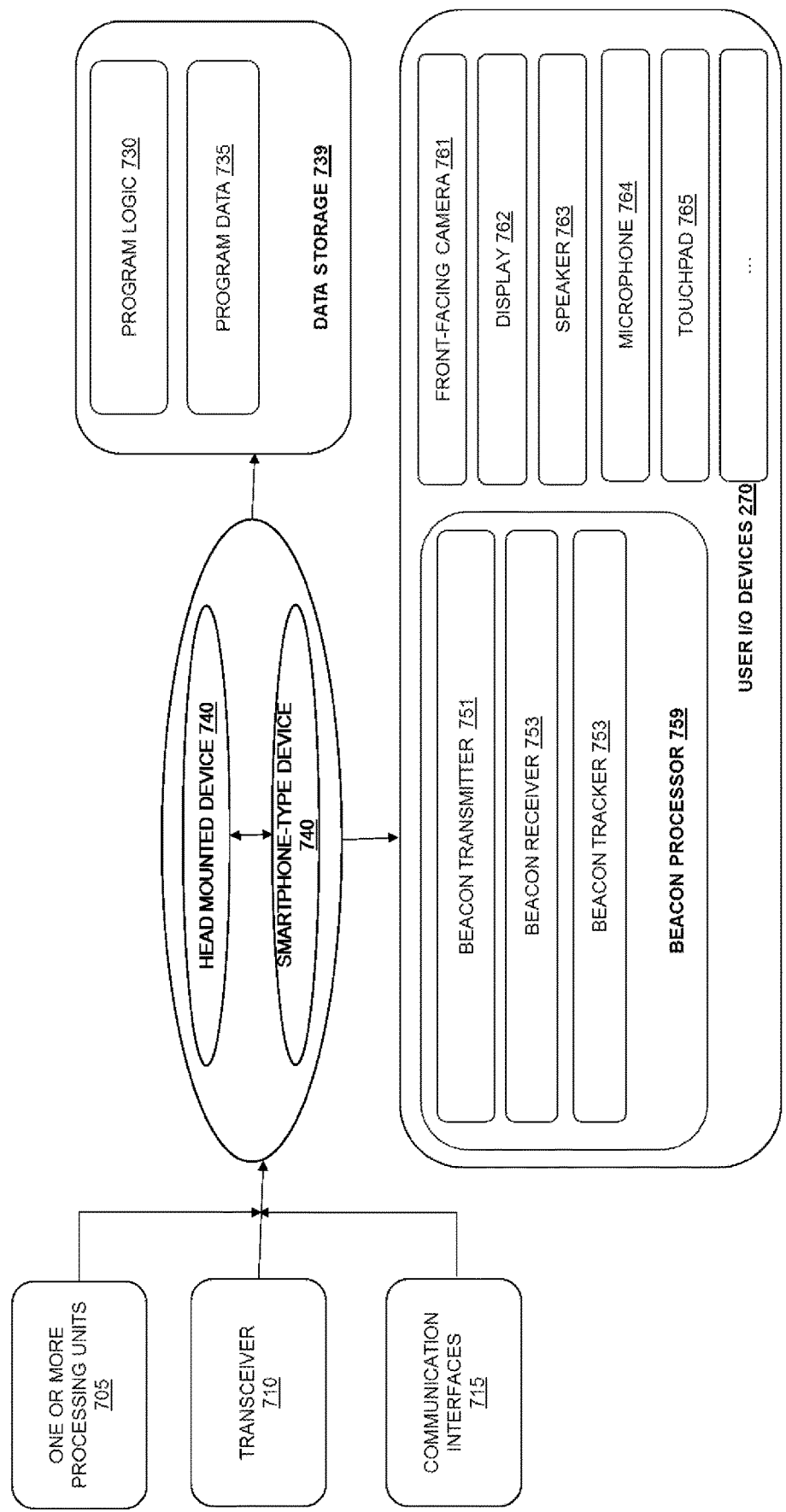
FIG. 7 is a block diagram depicting the system architecture of an example embodiment of a system utilizing a gaze initiated interaction technique.

FIG. 7 depicts the architecture of an example embodiment of a system implementing aspects of the novel gaze initiated interaction technique. The system comprises two mobile devices, namely a head-mountable device 740 and a smartphone-type mobile device 745. Both devices 740 745 are used in conjunction with each other and are thus treated as a single unit for the purposes of the system diagram. The system comprises one or more processing units 705, a transceiver 710 for mobile communications via the smartphone-type device 745 and a plurality of communication interfaces 715. The device comprises a data storage component 739, which in turn comprises stored program logic 730 and stored program data 735. The system also comprises a plurality of user input and output devices 270. The plurality of input and output devices comprises a beacon processor 759. The beacon processor comprises a directional beacon transmitter 751, a directional beacon receiver 753 and a beacon tracker 753. Other user input and output devices in the preferred embodiment are a front-facing camera 761, a display 762, a speaker 763, a microphone 764 and a touchpad 765.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The gaze initiated interaction technique may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for processing operations relating to gaze-interlock events on a social network server, the method comprising:
    registering a first unique identifier as an attribute against a first user profile on
    a social network, wherein said first user profile belongs to a person; and
    receiving a second unique identifier from a mobile device configured for detecting gaze-interlock events, wherein a gaze-interlock event is detected when a field of view of said person and a field of view of a human operator of said device are overlapping, and wherein said second unique identifier is determined as part of the detection of said event; and
    receiving a user identifier from said mobile device, wherein said user identifier is linked to said human operator and wherein said user identifier is linked to a second social network profile; and
    sending instructions for tagging said person in augmented reality to said mobile device in response to receiving said second unique identifier, wherein said response is conditional on:
    finding the first social network profile through a lookup procedure, wherein said lookup procedure comprises using said second unique identifier as a key and wherein the first social network profile is found when said second unique identifier matches said attribute.

2. The method of claim 1 further comprising:
    executing a first matching logic, wherein said first matching logic is configured to compare one or more exclusion or inclusion criteria with said second profile, wherein said criteria are associated with said first profile.

3. The method of claim 2 further comprising:
    executing a second matching logic, wherein said second matching logic is configured to compare one or more exclusion or inclusion criteria with said first profile, wherein said criteria are associated with said second profile.

4. The method of claim 3 further comprising:
    evaluating the result of one or more matching logics and authorizing the tagging of said person in the augmented reality of said human operator based on said result.

5. The method of claim 4 further comprising:
    sending instance data to said mobile device, wherein said sending of instance data is conditional on said result and wherein said instance data comprises data which is required in order for said person and said human operator to be able to interact through an application for social networking.

6. The method of claim 5 wherein said instance data enables said application to offer adding said person as a social networking friend.

7. The method of claim 5 wherein said instance data enables said application to offer messaging said person.

8. The method of claim 5 wherein said instance data enables said application to offer including said person in an augmented reality game.

9. The method of claim 5 wherein said instance data enables said application to offer browsing information relating to said person.

10. The method of claim 5 wherein said instance data enables said application to offer opening a two-way live communication channel with said person.

11. The method of claim 1 further comprising:
    sending instructions for populating a plurality of menu cards to said mobile device, wherein said menu cards offer a choice of options for interacting through social networks.

12. A device for social networking in augmented reality, the device comprising:
    one or more processing units; and
    a camera for capturing optical data, wherein said camera is configured to be pointing in a direction which is comprised in a field of view of a human operator of said device and wherein said optical data, when processed by the one or more processing units, is capable of yielding an identifier as a result of said human operator being in the field of view of a person; and
    a display, wherein said display is capable of superimposing augmented reality content over a real-word scene; and
    a transceiver for mobile communications;
    and wherein said one or more processing units are configured in such a way that, contingent on the detection of said identifier:
    said processing units cause control signals to be relayed to said transceiver for querying one or more social networks with said identifier and wherein said device causes said person to be tagged in augmented reality and wherein said tagging is conditional on a response to said querying and wherein said tagging is executed by said processing units relaying control signals to said display.

13. The device of claim 12 wherein said camera is an infrared-spectrum camera.

14. The device of claim 12 wherein said tagging comprises a menu panel which is superimposed on the augmented reality scenery.

15. The device of claim 14 wherein said menu panel displays menu cards and wherein said menu cards offer modes for socially networking with said person.

16. The device of claim 14 wherein said menu panel comprises a plurality of menu cards, wherein each menu card is associated with a social network and wherein the plurality of menu cards comprises associations with a plurality of social networks.

17. The device of claim 12, wherein said identifier is anonymous in such a way that, when viewed in isolation or when used as a key for querying a public data store, said identifier is unsuitable for revealing the identity of said person.

18. The device of claim 12, wherein said identifier is person-specific in such a way that the identifier is a unique identifier which has been registered against a social network profile of said person.

19. The device of claim 12, wherein said camera is forward-facing.

20. The device of claim 19, wherein said camera is affixed to a head-mountable component of said device.

21. The device of claim 12 further comprising a directional beacon transmitter.

22. The device of claim 21 wherein said directional beacon transmitter is configured to emit a beam of light, wherein a wavelength of said light is comprised in the infra-red spectrum.

23. The device of claim 22 wherein said directional beacon transmitter is configured to direct said beam of light in a direction which is comprised in said field of view of said human operator and wherein a wavelength of said light is comprised in the infra-red spectrum and wherein said beam is modulated in such a way that it carries an outbound identifier.

24. The device of claim 12 wherein said camera is configured to image light, wherein said light is of a type which is emitted by a directional beacon transmitter, wherein said transmitter emits one or more beams of infra-red light.

25. A non-transitory computer readable storage medium having data stored therein representing software executable by a computer, the software including instructions to process gaze interlock events, the storage medium comprising:

instructions for receiving event notifications from a detector for gaze-interlock events wherein said detector comprises a camera and wherein said events are triggered when the gaze of a person is being directed towards a human operator of said camera and when said camera is pointing in a direction, wherein said direction is comprised in the field of view of said operator; and instructions for tagging said person in the augmented reality of said operator, contingent on the detection a gaze-interlock event, wherein said tagging is conditional on the responses received from one or more queries to one or more social networks, wherein said queries are parametrized with an identifier and wherein said identifier is obtained when detecting the gaze-interlock event.

26. The non-transitory computer readable storage medium of claim 25 wherein said tagging comprises a menu panel which is superimposed on the augmented reality scenery.

27. The non-transitory computer readable storage medium of claim 26 wherein said menu panel displays menu cards and wherein said menu cards offer modes for socially networking with said person.

28. The non-transitory computer readable storage medium of claim 26 wherein said menu panel comprises a plurality of menu cards, wherein each menu card is associated with a social network and wherein the plurality of menu cards comprises associations with a plurality of social networks.

29. The non-transitory computer readable storage medium of claim 25, wherein said identifier is anonymous in such a way that, when viewed in isolation or when used as a key for querying a public data store, said identifier is unsuitable for revealing the identity of said person.

30. The non-transitory computer readable storage medium of claim 25, wherein said identifier is person-specific in such a way that the identifier is a unique identifier which has been registered against a social network profile of said person.

* * * * *